United States Patent [19]
Fischer

[11] 3,964,229
[45] June 22, 1976

[54] EXPANSION ANCHOR FOR SUSPENDED CEILINGS AND OTHER SUSPENDED ELEMENTS

[76] Inventor: Artur Fischer, Altheimer Str. 219, D-7241 Tumlingen, Germany

[22] Filed: Aug. 7, 1974

[21] Appl. No.: 495,523

[30] Foreign Application Priority Data
Aug. 30, 1973 Germany............................ 2343713

[52] U.S. Cl................................ 52/698; 248/300; 248/317
[51] Int. Cl.²...................... E04C 5/12; E04C 5/16; B42F 13/00
[58] Field of Search..................... 52/512, 712–714, 52/698, 704; 85/74, 75; 248/58, 59, 300, 317

[56] References Cited
UNITED STATES PATENTS

| | | | |
|---|---|---|---|
| 525,222 | 8/1894 | Levering | 85/75 |
| 979,853 | 12/1910 | Hartshorn | 85/75 |
| 1,193,636 | 8/1916 | Van Antwerp | 84/75 |
| 1,434,394 | 11/1922 | Matthes | 85/75 |
| 1,555,300 | 9/1925 | Martin | 52/714 |
| 1,616,426 | 2/1927 | Isaacson | 52/714 |
| 3,185,424 | 5/1965 | Sloop | 248/300 |
| 3,218,771 | 11/1965 | Horn | 52/713 |
| 3,570,021 | 3/1971 | Watson | 85/75 |

*Primary Examiner*—Ernest R. Purser
*Assistant Examiner*—James L. Ridgill, Jr.
*Attorney, Agent, or Firm*—Michael J. Striker

[57] ABSTRACT

An expansion sleeve has a leading end and a trailing end, and an expander member is located at the leading end and can be drawn into the sleeve for expanding the same, by turning of a threaded member which extends through the sleeve and is engaged with the expander member. The threaded member has a portion extending outwardly beyond the trailing end of the sleeve. A nut is threaded onto this portion, and a mounting bracket, folded to form a passage, is placed onto this portion, so that the portion extends through the passage and the mounting bracket is located between the nut and the trailing end of the expansion sleeve. The mounting bracket is formed with cutouts or the like to which securing members for elements to be suspended can be fastened.

6 Claims, 2 Drawing Figures

EXPANSION ANCHOR FOR SUSPENDED CEILINGS AND OTHER SUSPENDED ELEMENTS

BACKGROUND OF THE INVENTION

The present invention relates generally to an expansion anchor, and more particularly to an expansion anchor which is especially suited for suspended ceilings and other suspended elements, such as pipes, ducts and the like.

Many different types of expansion anchors are already known in the art. However, in all of these it is necessary that the element which is to be mounted on a support by means of the expansion anchor, be connected to the screw or bolt that serves to effect the expansion of the expansion anchor. If the anchor is to be secured in a support and a suspended ceiling, a suspended pipe, a suspended duct or a similar suspended element is to be hung from it, these prior-art expansion anchors cannot be utilized since the suspended element, such as the ceiling or the like, will in most instances simply be too far downwardly spaced from the expansion anchor and the support in which the latter is anchored.

The prior art has proposed a special expansion anchor for such applications, which utilizes a conical expander member that is placed into a bore hole formed in the support to which the anchor is to be secured. Thereupon, the expansion anchor sleeve is inserted into the bore hole and forcibly driven into the same, so that its leading end slips over the expander member and thereby becomes expanded. The difficulty with this structure is that once the sleeve has been driven into the bore hole and expanded by the expander member, it is not possible to determine immediately whether the extent of expansion is sufficient in order to afford the requisite anchoring effect. If subsequently it is found out that the anchor is not sufficiently firmly anchored in the bore hole of the support, then it is not possible to take any steps to further improve the anchoring effect, an obvious and very decided disadvantage.

SUMMARY OF THE INVENTION

It is therefore a general object of the invention to overcome the disadvantages of the prior art.

More particularly, it is an object of the invention to provide an improved expansion anchor which is especially suitable for mounting suspended elements, such as suspended ceilings, suspended pipes, suspended heating ducts or the like.

Another object of the invention is to provide such an improved expansion anchor which can be reliably anchored in a support, and which includes a component to which the securing wires, hooks or similar securing portions of the element to be suspended, can be readily connected.

In keeping with these objects, and with others which will become apparent hereafter, one feature of the invention resides in an expansion anchor for suspended ceilings and other suspended elements, which comprises an expansion sleeve having a leading end and a trailing end, an expander member at the trailing end, and an elongated threaded member extending through the sleeve and connected with the expander member for drawing the latter into the sleeve to expand the same. The threaded element has a portion that projects out of the trailing end and a nut is threaded onto this portion. A mounting bracket for connection with fasteners of suspended elements is also provided as part of the expansion anchor, having a passage through which the portion of the threaded member extends. The mounting bracket further has connecting portions for connection with the fasteners of the suspended elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
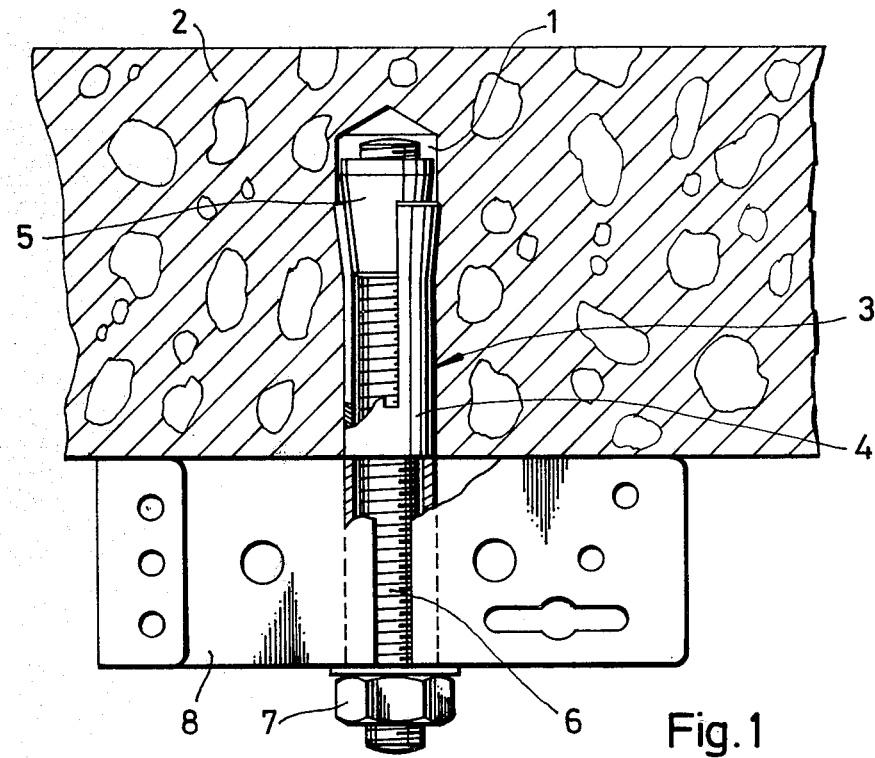
FIG. 1 is a sectional view illustrating an expansion anchor according to the present invention mounted in a support.

Referring now in detail to the drawing, it will be seen that reference numeral 1 identifies a bore hole formed in a support 2, such as masonry structure or the like. In this bore hole 1, the expansion anchor 3 according to the present invention is firmly anchored. The expansion anchor utilizes an expansion anchor sleeve 4, a conical expander member 5, and a threaded screw 6 which extends through the expansion sleeve 4 and is connected with the expander member 5. A portion of the screw 6 projects out of the trailing end of sleeve 4 and out of the inlet of the bore 1 and a nut 7 threaded onto it.

Figure 2:
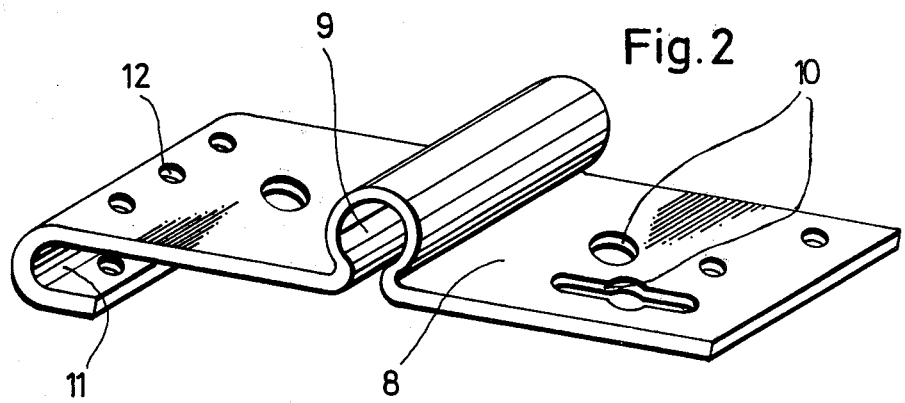
FIG. 2 is a perspective view of the bracket of the expansion anchor in FIG. 1.

This portion of the screw 6 is surrounded, intermediate the nut 7 and the trailing end of the sleeve 4, by a sheet material (sheet metal or sheet plastic) bracket 8 which is so arranged that its general plane parallels or coincides with the longitudinal axis of the screw 6. The bracket 8, which is shown in more detail in FIG. 2, is formed with a fold which is here centrally located and forms a passage 9 through the outwardly extending portion of the screw 6 extends. The bracket 8 is further provided at opposite sides of the passage 9 with a plurality of means 10, such as cutouts of slot-shaped or other configuration, into which wires, straps or the like can be inserted and secured on which the element to be suspended—such as a ceiling, a pipe or the like—is mounted. In the illustrated embodiment, one side of the bracket 8 is deformed to a U-shaped configuration, to form a receiver 11 for a slotted hanger strip which can be secured in this receiver by passing cotter pins or the like through the transverse bores 12.

It will be appreciated that the bracket 8 could be of a configuration different from what has been illustrated without in any way departing from the invention. In particular, it could also extend rearwardly beyond the trailing end of the screw 6, and the portion which so extends could be provided with an opening for securing of wires or similar suspending members that would be located symmetrically with reference to the axis of the screw 6.

It is also possible to form the passage 9 in a manner different from what has been illustrated. Thus, the two transversely spaced edge faces of the bracket could be formed with flanges extending transverse to its general plane, and which could be provided with registering holes through which the rearwardly projecting portion of the screw 6 could extend.

The expansion anchor according to the present invention is very simple to use. The support 2 is formed with the bore hole 1, and the expansion anchor 3 is inserted into the bore hole until the bracket 8 abuts against the surface of the support 2. The nut 7 is now tightened on the screw 6, causing the expander member 5 to be drawn into the leading end of the sleeve 4, thereby expanding the same into firm frictional engagement with the material surrounding the bore hole 1. The reaction force resulting from the drawing-in of the member 5 is absorbed by the bracket 8 which abuts the surface of the support 2.

The degree of spreading of the sleeve 4, and therefore the degree of anchorage, depends upon the force required to draw the screw 6 in direction outwardly of the bore hole 1 by turning of the nut 7. This assures that when a certain predetermined force has been reached, the desired and predetermined anchoring effect is also automatically obtained, independently of the length of the distance to which the member 5 has been drawn into the sleeve 4. This means that a direct control of the degree of anchoring force is possible with the anchor according to the present invention, by controlling the torque applied to the nut 7, and that a further tightening of the nut 7 can subsequently be employed to increase the degree of anchorage if it is determined later on that this is necessary. Neither of these possibilities exists in the prior-art construction.

Thus, the present invention provides an expansion anchoring device which avoids the disadvantages of the prior art and greatly facilitates the mounting of suspended elements, including the safety of such mounting.

It will be understood that each of the elements described above, or two or more together, may also find a useful application in other types of constructions differing from the type described above.

While the invention has been illustrated and described as embodied in an expansion anchor for suspended ceilings and other suspended elements, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An expansion anchor device comprising, in combination, an expansion sleeve having a leading end and a trailing end; an expander member located at said leading end; a threaded member having an axis and coaxially extending through said expansion sleeve and connected with said expander member for drawing the latter into said leading end to expand said expansion sleeve, said threaded member having a portion projecting outwardly from said trailing end; and a sheet-material bracket having a circumferentially incomplete arcuate first portion bounding an axial slot and a passage for coaxially freely receiving said projecting portion of said threaded member, two second portions each located in a general plane which is substantially parallel to said axis, and two transition portions extending axially parallel to one another at said slot and each rigidly connecting one of said second portions to said first portion of said bracket, said second portions being formed with apertures for connecting thereto a component to be attached to a support in which the device is anchored.

2. An expansion anchor as defined in claim 1, and further comprising a nut threaded on said projecting portion of said threaded member and in contact with said first portion of said bracket.

3. An expansion anchor as defined in claim 1, wherein said bracket is of sheet metal.

4. An expansion anchor as defined in claim 1, wherein said mounting bracket comprises a sheet-metal body formed with a substantially cylindrical fold the interior of which defines said passage.

5. An expansion anchor as defined in claim 1, wherein said apertures are holes formed in said bracket.

6. An expansion anchor as defined in claim 5, wherein some of said holes are slot shaped.

* * * * *